(12) United States Patent
Holland et al.

(10) Patent No.: US 8,725,479 B2
(45) Date of Patent: May 13, 2014

(54) USE OF MONTE CARLO SIMULATIONS FOR ESTABLISHING CORRELATIONS AND THEIR UNCERTAINTIES

(75) Inventors: Marc Holland, Mainz (DE); Wouter E. Van Der Zee, Voorburg (NL)

(73) Assignee: Baker Hughes Incorporated, Houston, TX (US)

( * ) Notice: Subject to any disclaimer, the term of this patent is extended or adjusted under 35 U.S.C. 154(b) by 212 days.

(21) Appl. No.: 13/308,088

(22) Filed: Nov. 30, 2011

(65) Prior Publication Data
US 2013/0138405 A1 May 30, 2013

(51) Int. Cl.
*G06G 7/48* (2006.01)

(52) U.S. Cl.
USPC .......................................................... 703/10

(58) Field of Classification Search
USPC ............... 703/2, 6, 10, 13; 324/339; 369/73; 166/250.1; 702/7, 13, 16
See application file for complete search history.

(56) References Cited

U.S. PATENT DOCUMENTS

| | | | | |
|---|---|---|---|---|
| 5,444,619 A | * | 8/1995 | Hoskins et al. | 702/13 |
| 5,835,883 A | * | 11/1998 | Neff et al. | 702/7 |
| 5,838,634 A | * | 11/1998 | Jones et al. | 367/73 |
| 5,883,515 A | * | 3/1999 | Strack et al. | 324/339 |
| 7,349,807 B2 | | 3/2008 | Moos et al. | |
| 7,617,051 B2 | | 11/2009 | Sayers et al. | |
| 8,498,848 B2 | * | 7/2013 | Habashy et al. | 703/6 |
| 2010/0305865 A1 | | 12/2010 | Bachrach et al. | |
| 2011/0120702 A1 | * | 5/2011 | Craig | 166/250.1 |
| 2011/0257944 A1 | * | 10/2011 | Du et al. | 703/2 |
| 2011/0295510 A1 | * | 12/2011 | Gulati | 702/16 |

OTHER PUBLICATIONS

Den Boer, L. D. et al.; "Pore pressure prediction using well-conditioned seismic velocities," first break vol. 24, May 2006, pp. 43-49.
Malinverno, A.; "Integrating Diverse Measurements to Predict Pore Pressure with Uncertainties," SPE 90001, SPE Annual Technical Conference and Exhibition, Houston, Texas, Sep. 26-29, 2004, pp. 1-11.
Sayers, Colin M. et al.; "Well-constrained seismic estimation of pore pressure with uncertainty," The Leading Edge, Dec. 2006, pp. 1524-1526.
Sayers, C. M. et al.; "Predrill pore-pressure prediction using seismic data," Geophysics, vol. 67, No. 4, Jul.-Aug. 2002, pp. 1286-1292.

* cited by examiner

*Primary Examiner* — Kandasamy Thangavelu
(74) *Attorney, Agent, or Firm* — Cantor Colburn LLP

(57) ABSTRACT

A method and computer-readable medium for establishing an uncertainty for obtained values of a one-dimensional logging parameter mapped to a three-dimensional volume is disclosed. A relation is formed between the obtained values of the logging parameter and a volumetric parameter of the three-dimensional volume. A set of representative data points is obtained that relates the obtained values of the logging parameter to the volumetric parameter by binning the obtained values. A plurality of regression curves are then determined, wherein each regression curve is obtained by adding a random error to the set of representative data points to obtain a set of randomized data points and performing a regression analysis using the set of randomized data points. The plurality of regression curves are used to establish the uncertainty for the values of the logging parameter in the three-dimensional volume.

22 Claims, 11 Drawing Sheets

| Velocity | Density Run (1) | Density Run (2) | Density Run (...) | Density Run (N) |
|---|---|---|---|---|
| V1 | D11 | D12 | D1(...) | D1N |
| V2 | D21 | D22 | D2(...) | D2N |
| V3 | D31 | D32 | D3(...) | D3N |
| V4 | D41 | D42 | D4(...) | D4N |
| V(...) | D(...)1 | D(...)2 | D(...)(...) | D(...)N |
| V(n) | Dn1 | Dn2 | Dn(...) | DnN |

| Velocity | Density P10 | Density P50 | Density P90 |
|---|---|---|---|
| V1 | D1(p10) | D1(p50) | D1(p90) |
| V2 | D2(p10) | D2(p50) | D2(p90) |
| V3 | D3(p10) | D3(p50) | D3(p90) |
| V4 | D4(p10) | D4(p50) | D4(p90) |
| V(...) | D(...)(p10) | D(...)(p50) | D(...)(p90) |
| V(n) | Dn(p10) | Dn(p50) | Dn(p90) |

USE OF MONTE CARLO SIMULATIONS FOR ESTABLISHING CORRELATIONS AND THEIR UNCERTAINTIES

BACKGROUND OF THE DISCLOSURE

Petroleum exploration operations include the analysis of logging parameters to determine a formation representation. In an exemplary operation, a formation representation can be obtained by correlating the logging parameter to a low-resolution seismic volume parameter such as an seismic interval velocity obtained at equivalent depths. In such an operation, the correlation includes a least-square regression of the logging parameter. A typical assumption of the least-squares regression is that measurement errors occur only in the logging parameter measurements and not in the seismic interval velocity measurements. Also, it is assumed that non-systematic errors are normally distributed. These assumptions are typically incorrect, so that the least-squares regression generally does not provide a full representation of formation characteristics. The present disclosure therefore provides a method for determining a correlation for logging parameters and a seismic volume parameter that provides a better representation of the formations and associated uncertainties in the three-dimensional volume.

SUMMARY OF THE DISCLOSURE

In one aspect of the present disclosure, a method of establishing an uncertainty for obtained values of a one-dimensional logging parameter mapped to a three-dimensional volume is disclosed that includes: relating the obtained values of the logging parameter to a volumetric parameter of the three-dimensional volume; obtaining a set of representative data points relating the obtained values of the logging parameter to the volumetric parameter; obtaining a plurality of regression curves related to the set of representative data points, wherein obtaining a regression curve includes: (i) adding a random error within a statistical range to the set of representative data points to obtain a set of randomized data points, and (ii) performing a regression analysis using the set of randomized data points; and using the plurality of regression curves to establish the uncertainty for the values of the logging parameter in the three-dimensional volume.

In another aspect, the present disclosure provides a computer-readable medium having a set of instructions stored therein that when read by at least one processor enable the at least one processor to perform a method of establishing an uncertainty for values of a logging parameter mapped to a three-dimensional volume. The method includes relating the obtained values of the logging parameter to a volumetric parameter of the three-dimensional volume; obtaining a set of representative data points for the obtained values of the logging parameter; obtaining a plurality of regression curves related to the set of representative data points, wherein obtaining a regression curve includes: (i) adding a random error within a statistical range to the set of representative data points to obtain a set of randomized data points, and (ii) performing a regression analysis using the set of randomized data points; and using the plurality of regression curves to establish the uncertainty for the values of the logging parameter in the three-dimensional volume.

BRIEF DESCRIPTION OF THE DRAWINGS

For detailed understanding of the present disclosure, references should be made to the following detailed description, taken in conjunction with the accompanying drawings, in which like elements have been given like numerals and wherein:

FIG. 8A shows an exemplary lookup table formed using the exemplary method of the present disclosure; and FIG. 8B shows an exemplary confidence level lookup table obtained from the exemplary lookup table of FIG. 8A.

DETAILED DESCRIPTION OF THE DISCLOSURE

Figure 1A:
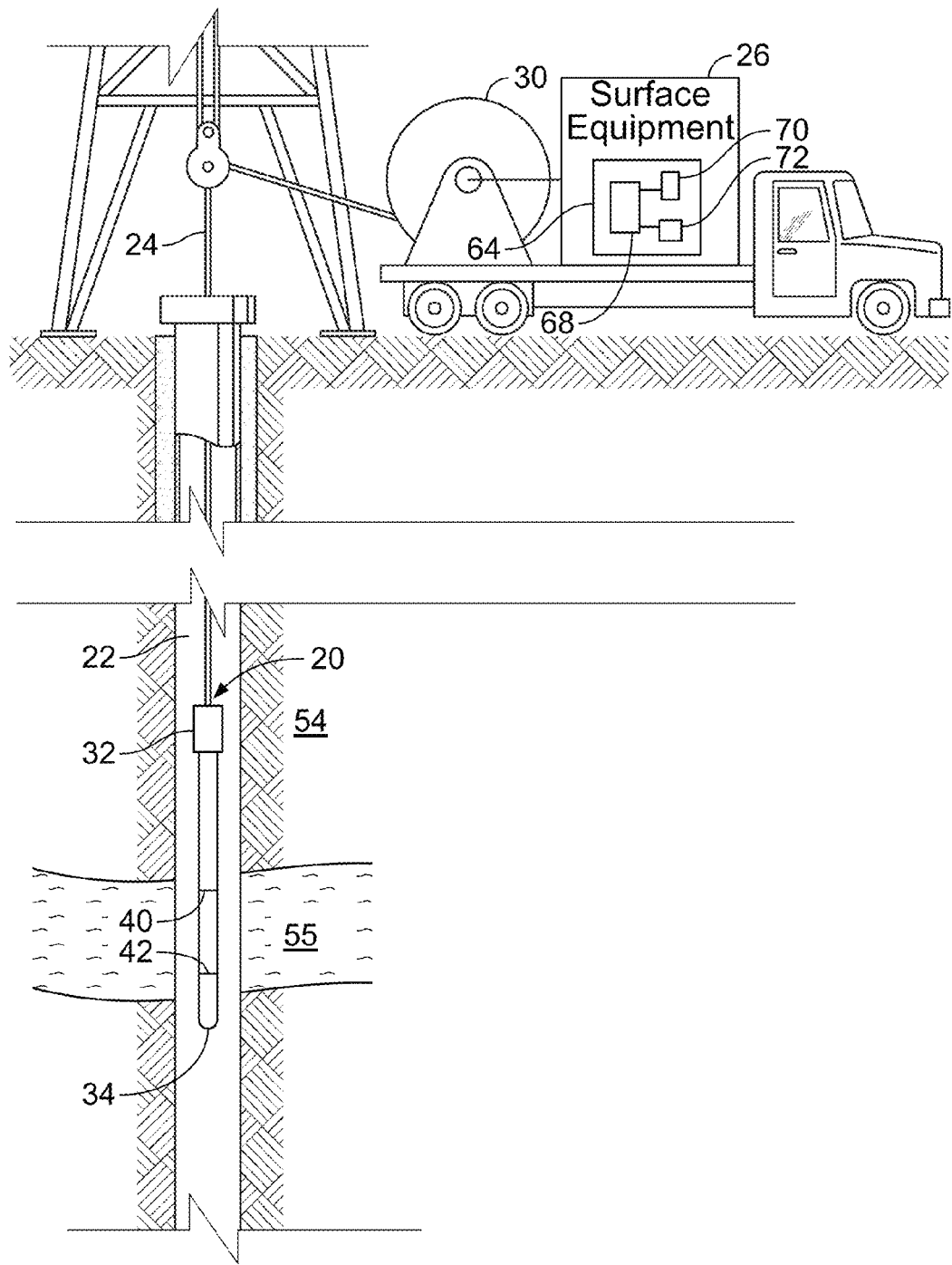
FIG. 1A shows an exemplary log of a one-dimensional logging parameter for an exemplary borehole and a three-dimensional volume parameter related to the formation.

FIG. 1A shows an exemplary wireline logging tool 20 according to an exemplary embodiment of the present disclosure for obtaining logging parameters of a formation. In other embodiments, logging parameters can be obtained using measurement-while-drilling and/or logging-while-drilling systems. The wireline logging tool 20 is suspended in a borehole 22 penetrating various earth formations 54 and 55 by means of a wireline cable 24. The tool 20 is lowered into the borehole 22 by the wireline cable 24, which passes over a sheave 30 located at the surface of the borehole 22. The wireline cable 24 is typically spooled onto a drum (not shown). The wireline cable 24 includes insulated electric conductors for transmitting electrical signals. The wireline tool 20 includes a borehole sonde 34 and an electronic circuitry section 32 at the downhole end of the wireline cable 24. The electronic circuitry section 32 of the tool 20 receives signals from the sonde section 34 to perform various analog and digital functions, as will be described later. The sonde 34 includes one or more exemplary sensors 40 and 42 that are used to obtain various exemplary logging parameters. In the present disclosure, the term "logging parameter" generally refers to a parameter directly obtained during a logging operation, such as density, or to a parameter derived from a logging operation such as effective stress and/or pore pressure, for example. Typically, the logging parameter is a one-dimensional parameter obtained at various depths of the borehole. The various logging parameters can be relayed from the sensors to a controller 64. The controller 64 can be at a surface location, as in FIG. 1, or at a downhole location in alternate embodiments.

A surface control unit or controller 64 receives signals from the downhole sensors and processes such signals according to programmed instructions of the exemplary methods described herein. The surface control unit can display desired parameters and other information on a display/monitor (not shown) that is utilized by an operator to control the drilling operations. The surface control unit 64 can be a computer-based unit that can include a processor 68 (such as a microprocessor), a storage device 70, such as a solid-state memory, tape or hard disc, and one or more computer programs 72 in the storage device 70 that are accessible to the processor 68 for executing instructions contained in such programs. The surface control unit 64 can process data from the sensors and can control one or more operations using the results of the processed data.

Figure 1B:
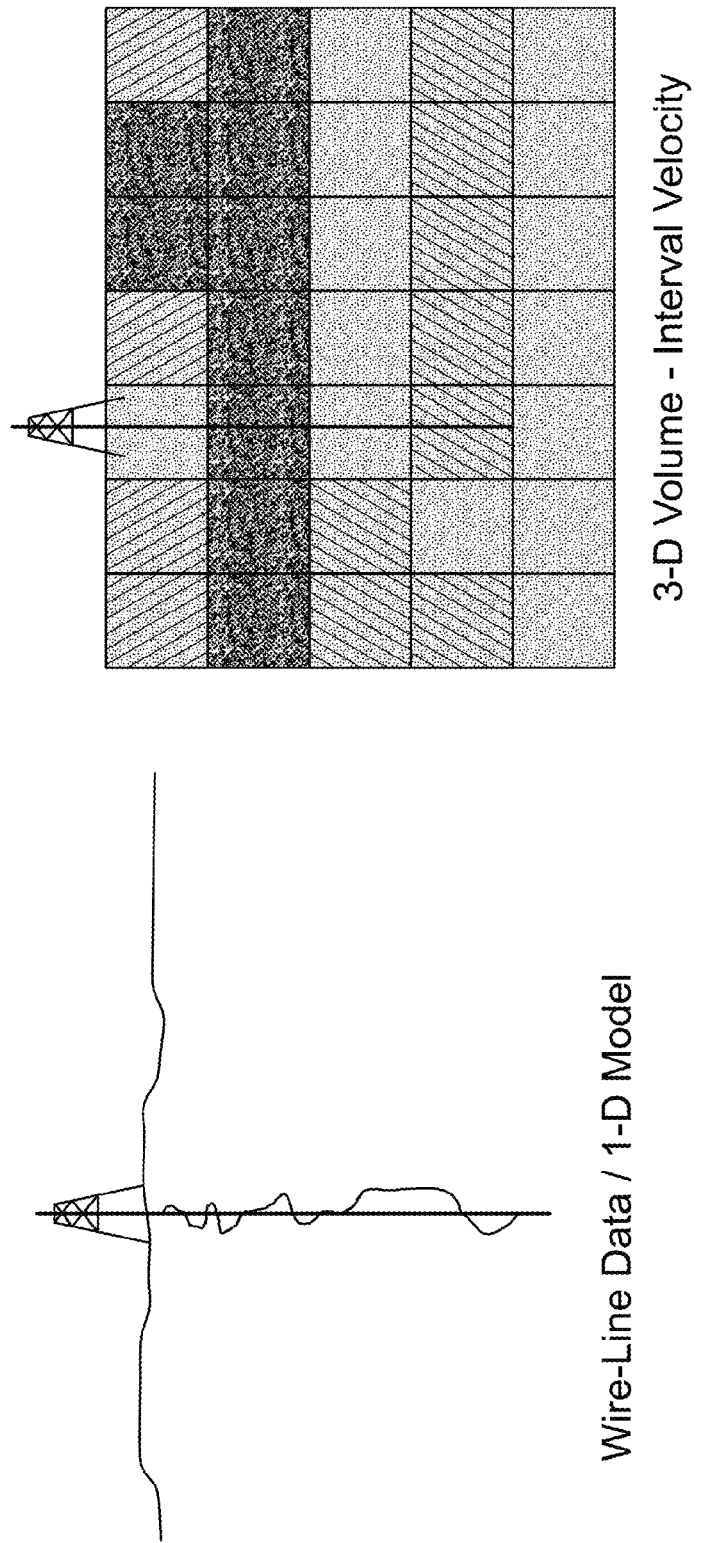
FIG. 1 shows an exemplary wireline logging tool according to an exemplary embodiment of the present disclosure for obtaining logging parameters of a formation.

FIG. 1B shows exemplary data sets for parameters related to the formation. A logging parameter obtained using the logging tool of FIG. 1A is shown in the diagram of the left-hand side. The logging parameter is a one-dimensional parameter. The diagram on the right-hand side shows interval velocities that are obtained over a three-dimensional volume. In one aspect of the present disclosure, the one-dimensional logging parameter from the left-hand side is mapped to the three-dimensional volume of on the right-hand side by correlating the logging parameter to a volumetric parameter, i.e, the interval velocities, at the borehole.

Figure 2C:
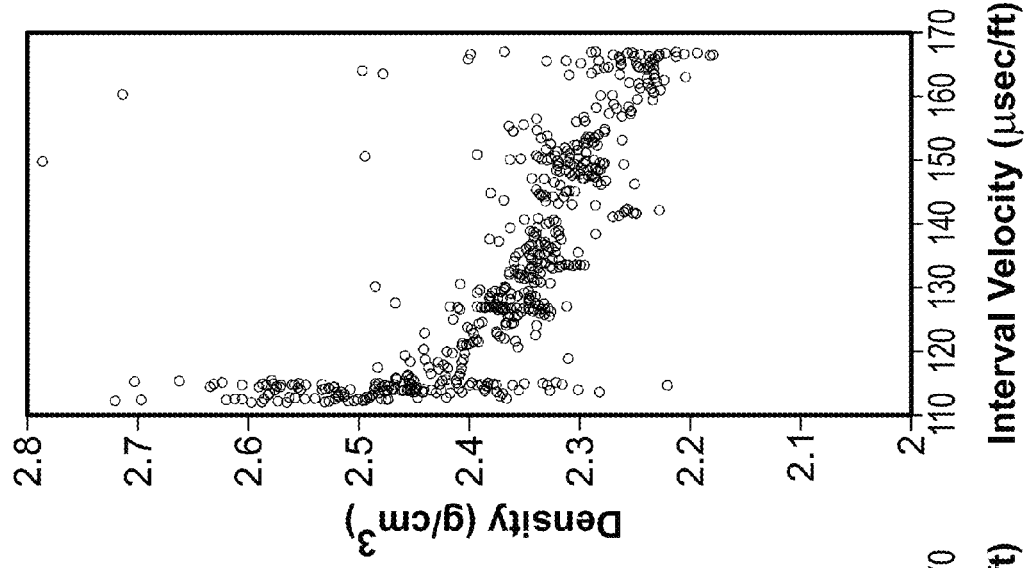
FIGS. 2A-2C show various parameter values obtained over a plurality of depths in a borehole that can be used with the exemplary methods described herein to obtain correlations and uncertainties in an exemplary embodiment of the present disclosure.
Figure 2B:
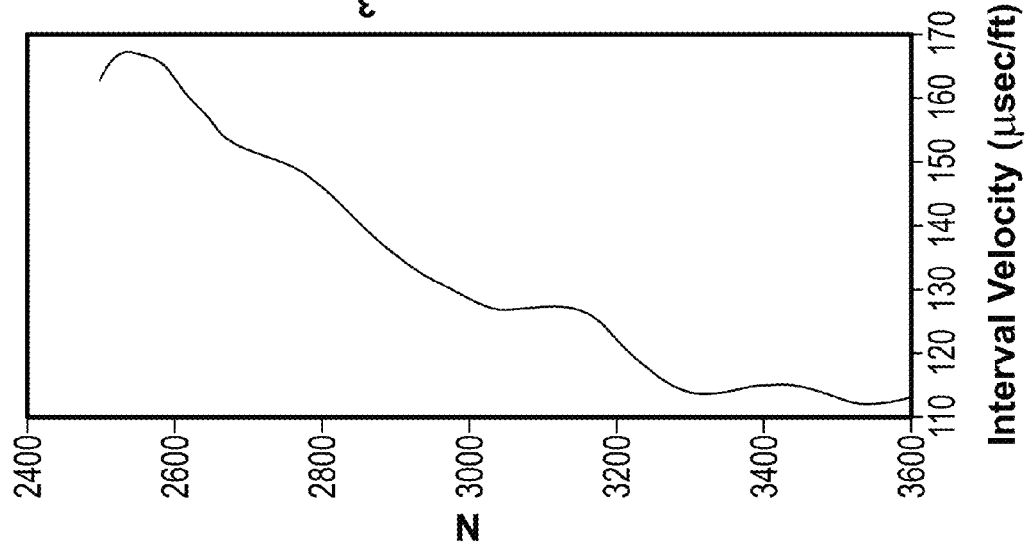
Figure 2A:
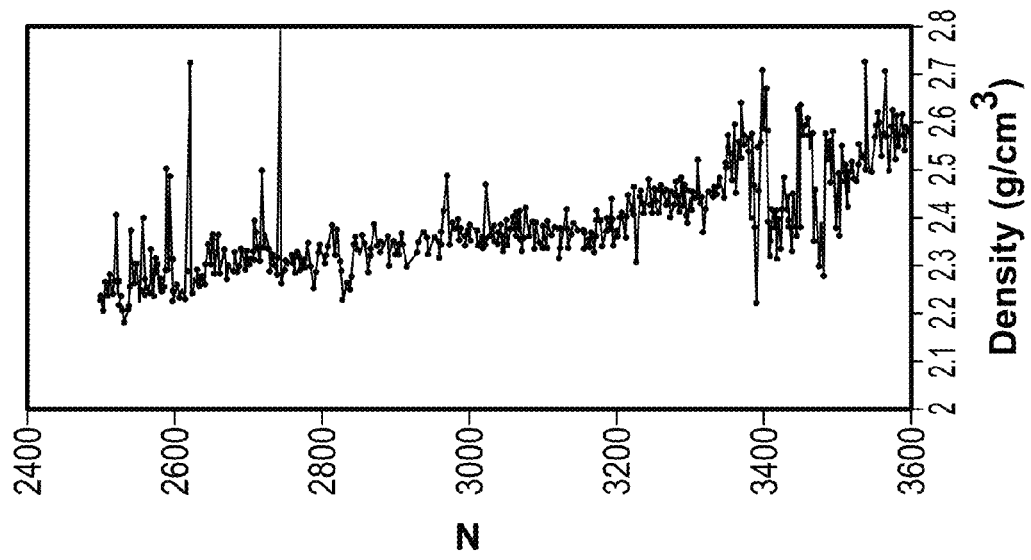

FIGS. 2A-2C show various parameter values over a plurality of borehole depths that can be used with the exemplary methods described herein to obtain correlations and uncertainties in one embodiment of the present disclosure. FIG. 2A shows a log of a density obtained over a plurality of depths ("depth interval") of the borehole. For the purposes of illustrating the methods of the present disclosure, density is shown as the exemplary logging parameter in FIG. 2A. In general, the logging parameter has a relatively small resolution scale (i.e., about one-half meter). The log of density shown in FIG. 2A is relatively rough as a result of the density distribution and resolution scale. FIG. 2B shows a synthetic log of seismic interval velocity ("interval velocity") over the same depth interval as in FIG. 2A. Seismic interval velocity is typically a three-dimensional volume data set. The synthetic log of seismic interval velocity shown in FIG. 2B is extracted from the three-dimensional volume at the location of the well. Unlike density, the seismic interval velocity has a relatively large resolution scale (i.e., in the tens of meters), resulting in a generally smooth curve. FIG. 2C shows a cross-plot of the density data of FIG. 2A against the seismic interval velocity data of FIG. 2B. The exemplary cross-plot includes interval velocity along the x-axis and density along the y-axis. Although described herein with respect to density and seismic interval velocity, the methods of the present disclosure can be used for a cross-plot between any two relevant parameters.

Figure 3:
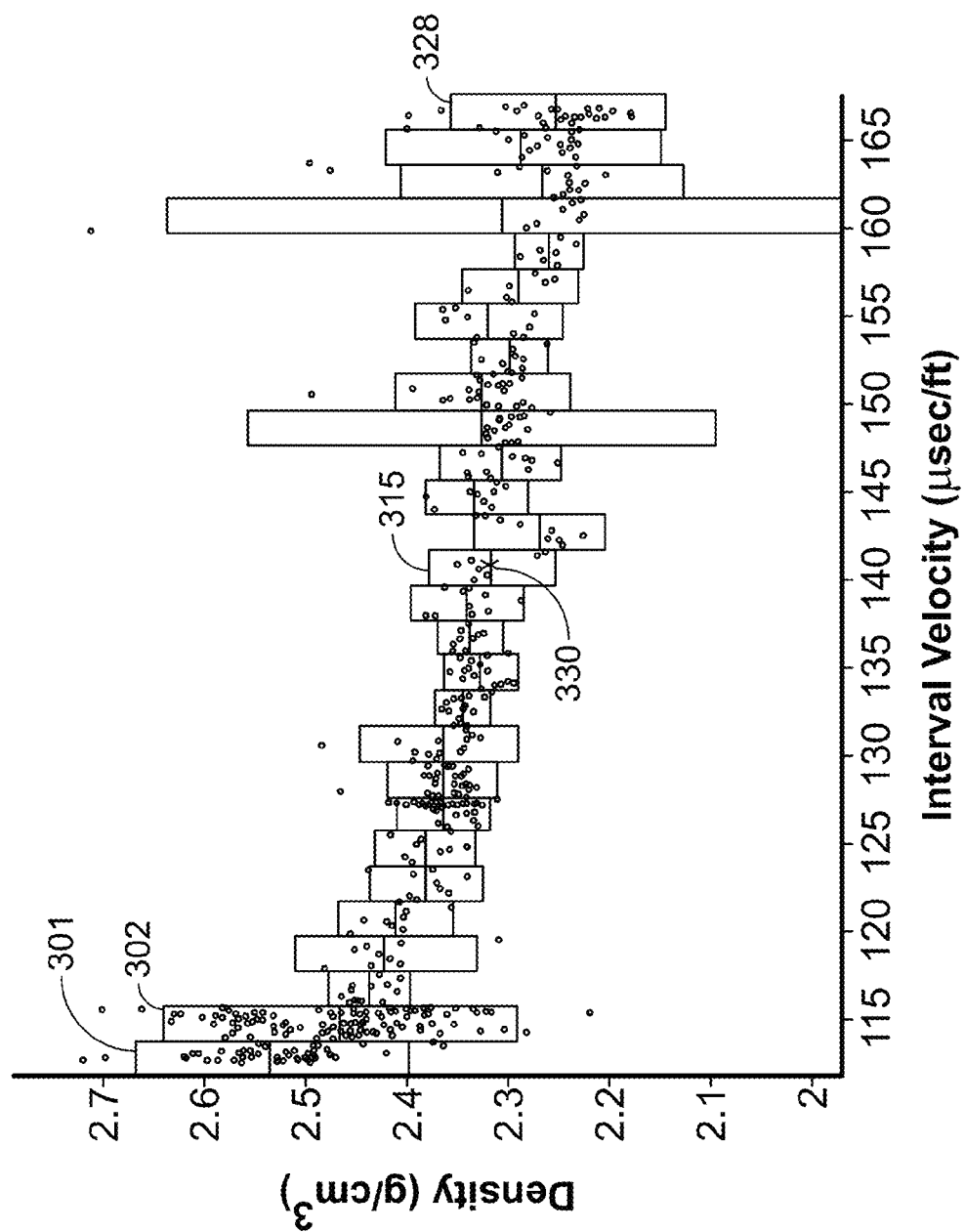
FIG. 3 illustrates a method of binning the exemplary cross-plotted data of FIG. 2C in an exemplary embodiment of the present disclosure.

FIG. 3 illustrates a method of binning the exemplary cross-plotted data of FIG. 2C in an exemplary embodiment of the present disclosure. Exemplary velocity bins 301, 302, . . . 328 are drawn to segment the x-axis (i.e., the seismic interval velocity axis) into a plurality of interval velocity bins, each interval velocity bin extending over a range of seismic interval velocities to define a bin width. The bin width is generally selected by an operator. In the exemplary embodiment, the bin width is 2 microseconds/feet. The obtained values of the logging parameter are sorted into the bins. Once the data points have been sorted into their respective bins, a set of bin statistics for each bin is obtained.

Bin statistics for a selected bin generally include a count density, an interval velocity value, a mean logging parameter value, and standard deviation of the logging parameter values. The count density for a particular bin is simply the number of data points for the logging parameter that fall within the interval velocity range indicated by the bin. The data points in a particular bin are generally spread over various locations in the bin. A representative interval velocity for a velocity bin can be determined as the midpoint interval velocity of the bins. Alternatively, the representative interval velocity can be an average of the interval velocities in the bin.

The mean logging parameter value (i.e., average density) for the bin can be determined as an average value of the logging parameter values (y-components) of the data points in the selected bin. The logging parameters of a selected bin can be represented by a representation point having an x-value and a y-value. The x-value represents the determined bin interval velocity for the bin, and the y-value is the average of the logging parameters for the bin. An exemplary representative point 330 is shown for bin 315. Standard deviations for the logging parameter as well as for interval velocity can also be obtained for each bin using methods for normal distributions. The heights of each bin 301, . . . , 328 shown in FIG. 3 are two times the standard deviation of the logging parameter values for the particular bin. The representative points and bin statistics are used in subsequent calculations of the exemplary method of the present disclosure, as discussed below.

In one embodiment, the representative points are used to determine a plurality of regression curves. A single regression curve is obtained from the representative points by determining a set of randomized data point from the representative points and then performing a regression analysis using the randomized data points. A plurality of iterations of this process is then performed to obtain the plurality of regression curves. The methods for obtaining a randomized data point and determining the regression curve is described in detail below. After each iteration, curve parameters obtained for the regression curve are used to calculate a realization of the logging parameters or realized values of the logging parameters. The realization is stored in a look-up table.

Figure 4:
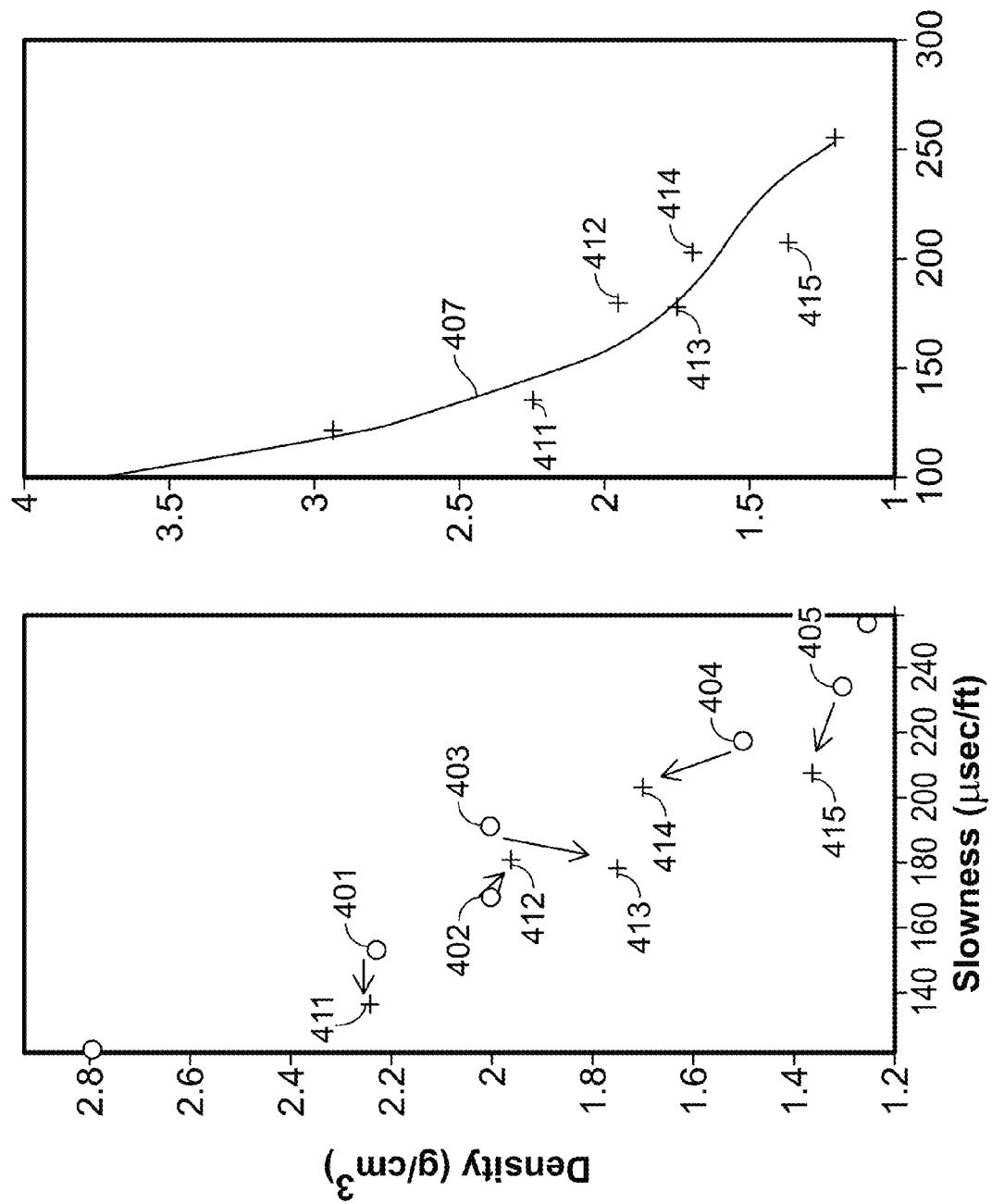
FIG. 4 illustrates a single iteration process for obtaining a regression curve from the representative data points of interval velocity bins.

FIG. 4 illustrates a single iteration of the exemplary method for obtaining a regression curve from the representative data points obtained from the binning method illustrated in FIG. 3. Graph 400 shows representative data points as circles (i.e., exemplary circles 401-405). Randomized data points are indicated by crosses (i.e., exemplary crosses 411-415). Arrows are drawn connecting the representative data points to their associated randomized data points. Since each representative data point is associated with a selected bin, each randomized data point is also associated with a selected bin. The randomized data points are obtained using Monte Carlo methods. In one embodiment, a random error is added to the x-value of the representative point and a random error is added to the y-value of the representative point to obtain the coordinates of the associated realized data point. In one embodiment, the random error along the x-axis can be a random number limited by the width of the velocity bin. Alternately, the random error along the x-axis can be a random number selected from a normal distribution of interval velocities within the selected bin. The random error along the y-axis is a random number selected from a normal distribution of logging parameter values in the selected bin. The standard deviation of the normal distribution of the logging parameter is obtained using standard methods.

The randomized data points (i.e., exemplary crosses 411-415) are then used to determine a regression curve 407 via a regression analysis. When performing the regression analysis on the randomized data points, each randomized data point is weighted by the number of data points in its associated bin. Therefore, a randomized data point associated with a velocity bin that has 100 data points is replicated 100 times, and a randomized data point associated with a bin that has 2 data points is replicated 2 times. This replication ensures that bins containing a large number of logging parameter values will have a corresponding weight in the regression analysis. The regression analysis in one embodiment is a least sum of squares regression using a user defined curve. In various embodiments, the user-defined curve can be a linear function, a function of second degree or higher or a polynomial function. The outcome of a regression analysis also provides a set of curve parameters for the resulting regression curve. These curve parameters are used to calculate a realization of the logging parameters to be stored in the look-up table. Another iteration can then be performed to obtain another set of curve parameters and another realization of logging parameters can be calculated and stored in the look-up table. The number of iterations is generally selected by an operator. Once the selected number of iterations has been performed, a confidence interval can be obtained for the obtained values of the logging parameter, as discussed below.

Figure 5:
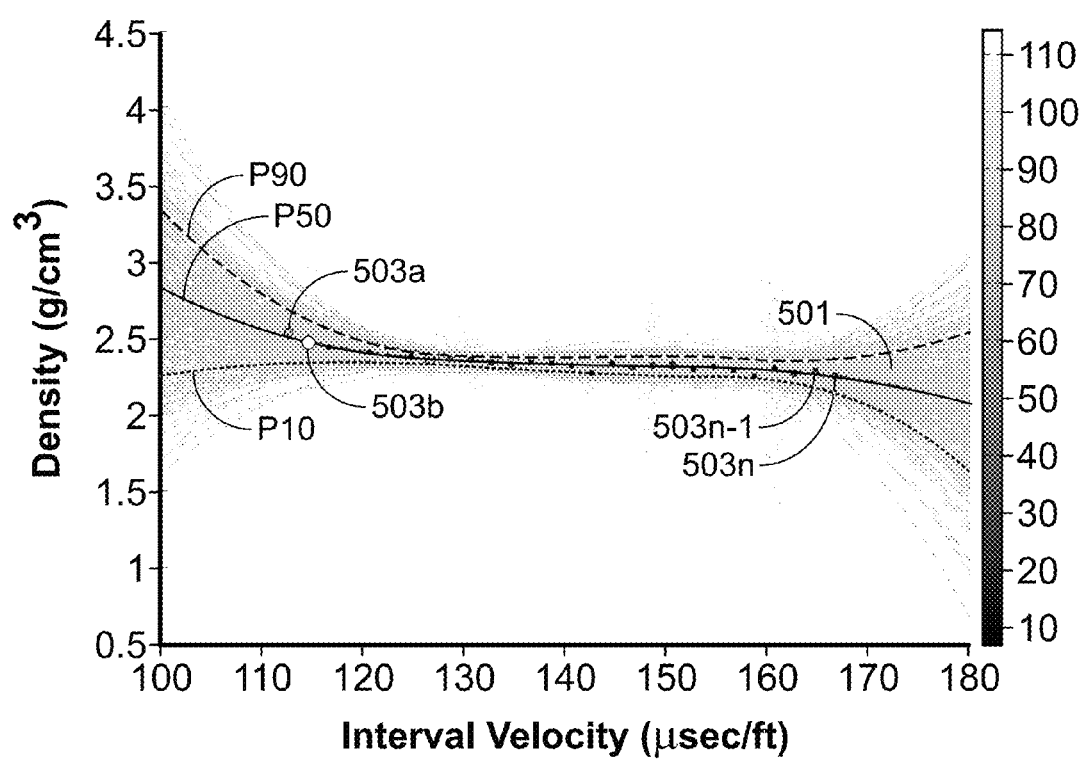
FIG. 5 shows a plurality of regression curves obtained using the exemplary method of the present disclosure.

FIG. 5 shows a plurality of regression curves 501 obtained using the exemplary methods of the present disclosure. The representative data points are indicated by the circles 503a, 503b, . . . , 503n–1, 503n. The size and color of the circles are indicative of the count density associated with the representative data points. One can see that the regression curves are closely grouped in the region between interval velocities of about 120 microseconds/feet and about 165 microseconds/feet. Thus, there is relatively small uncertainty in the density values in this region. Outside this region, the regression curves tend to diverge from each other, thereby yielding a large uncertainty in the density values obtained in this region.

Figure 6B:
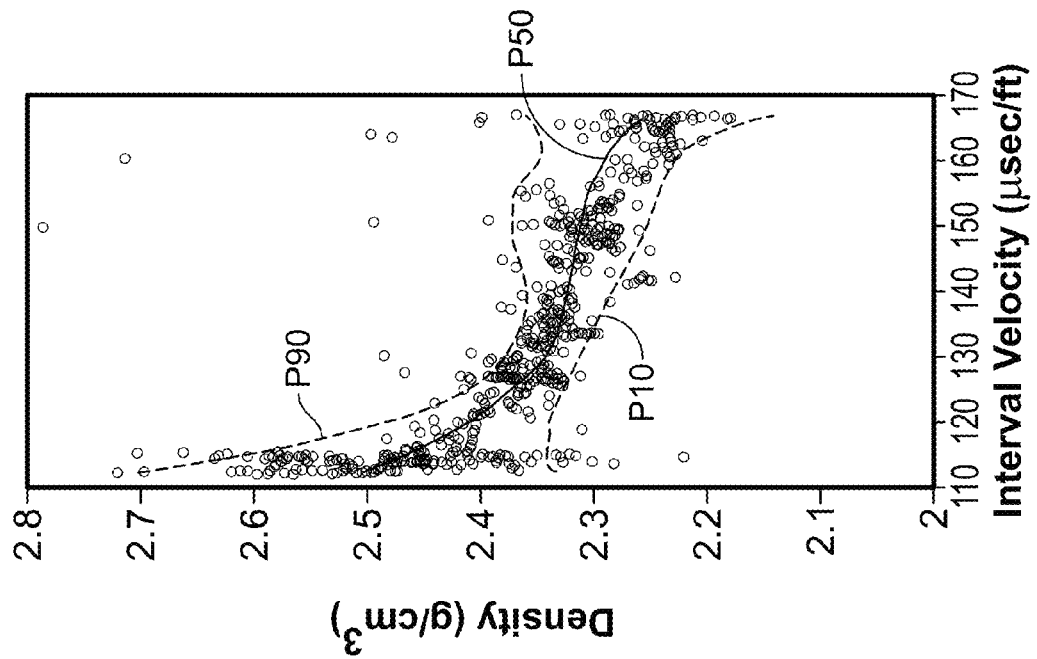
FIGS. 6A and 6B show determined uncertainties or the logging parameters and cross-plotted data of FIGS. 2A-2C.
Figure 6A:
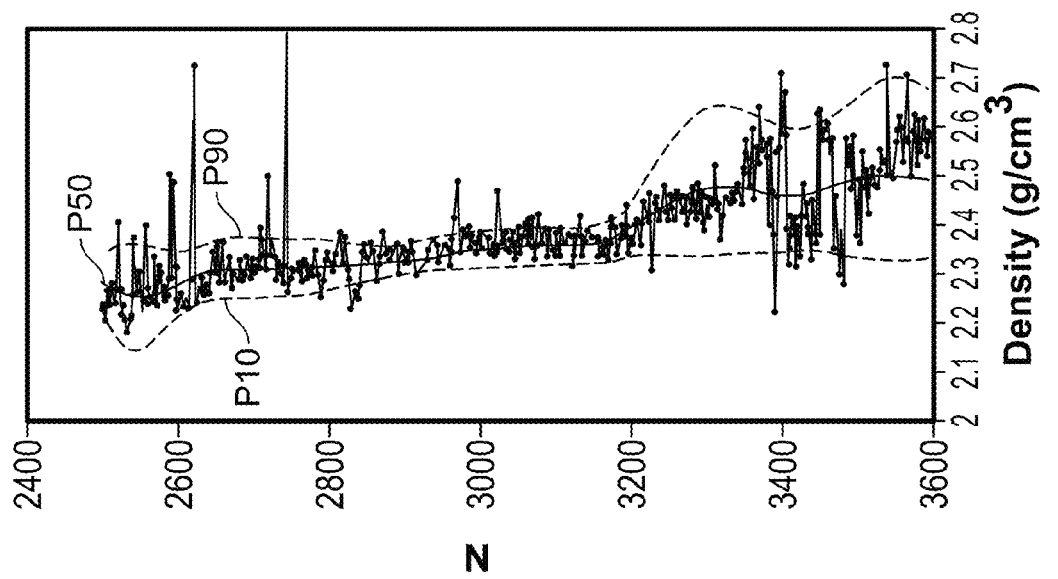

In the exemplary illustration of FIG. 5, confidence intervals for 10% (P10), 50% (P50) and 90% (P90) are shown. The confidence interval P50 indicates a most likely value of logging parameters. A logging parameter has a 10% likelihood of within the interval defined by the P-10 line. A logging parameter has a 90% likelihood of being within the interval define by the P-90 line. The present disclosure is not limited to the number or type of confidence intervals obtained. For example, 5% (P5) and 95% (P95) confidence intervals can be obtained in alternate embodiments. The confidence intervals can then be used to represent the uncertainties in logging parameter measurements at various depths and/or interval velocities. The determined uncertainties track well to the logging parameter as shown in FIGS. 6A and 6B. The determined uncertainties can therefore be used to characterize a formation.

FIG. 6A shows the logging parameters of FIG. 2A including the determined confidence intervals obtained using the methods disclosed herein. The confidence intervals match the spread of the data points. For example, in the depth interval between about 2800 feet and 3000 feet, where the density data is relatively close (between about 2.3 g/cm^3 and about 2.4 g/cm^3), the P10 and P90 confidence intervals (uncertainty of the density values) are close together. However, at depths between about 2500 feet and 2800 feet as well as the depths between 3000 feet and 3600 feet, where the density data is relatively wide-spread, the P10 and P90 confidence intervals are farther apart. FIG. 6B shows similar correlation between confidence intervals and data points for the cross-plotted data of FIG. 2C.

Figure 7A:
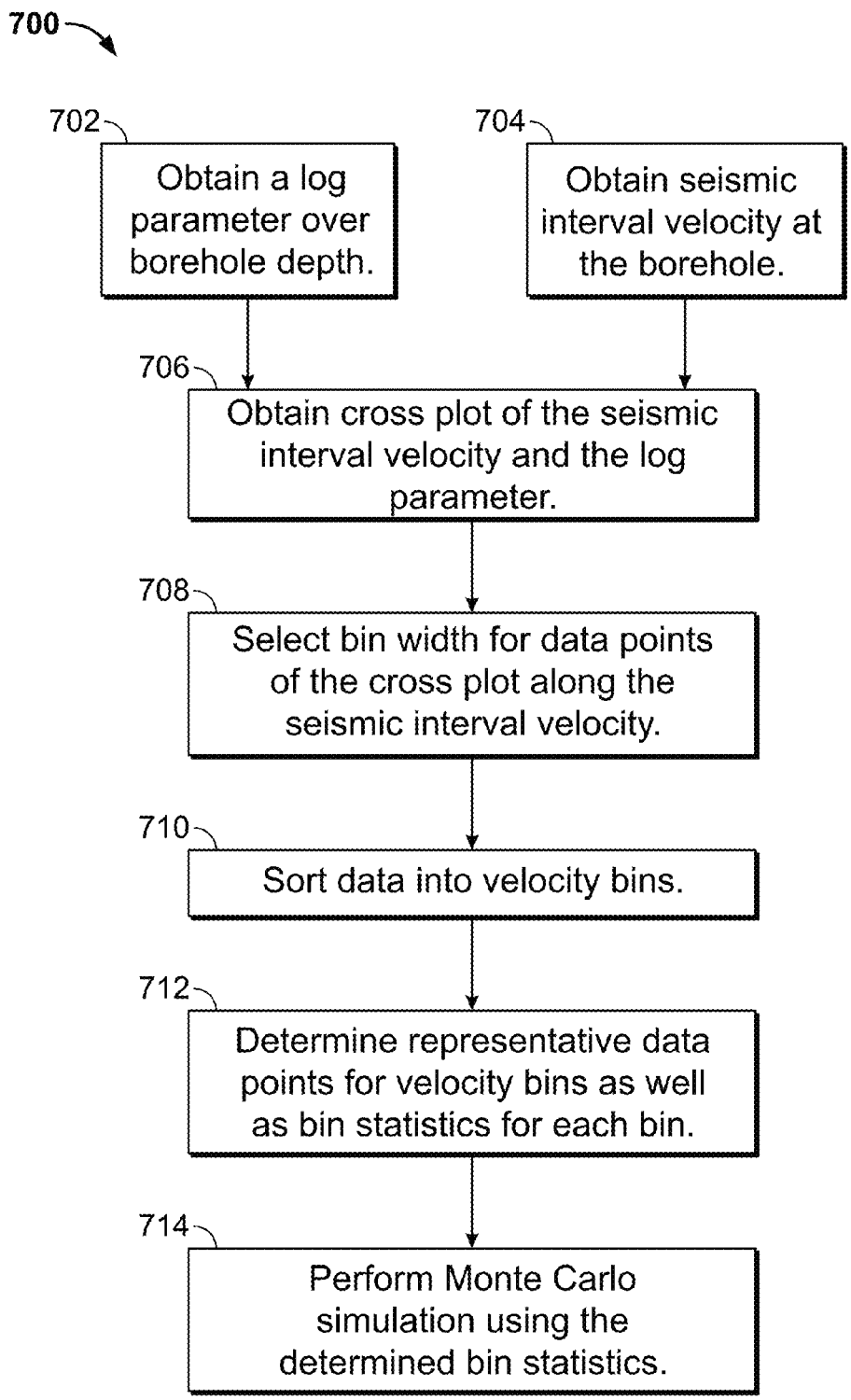
FIGS. 7A-7C shows a flowchart of an exemplary method of the preset disclosure for obtaining the correlations and uncertainties for logging parameter values.
Figure 7B:
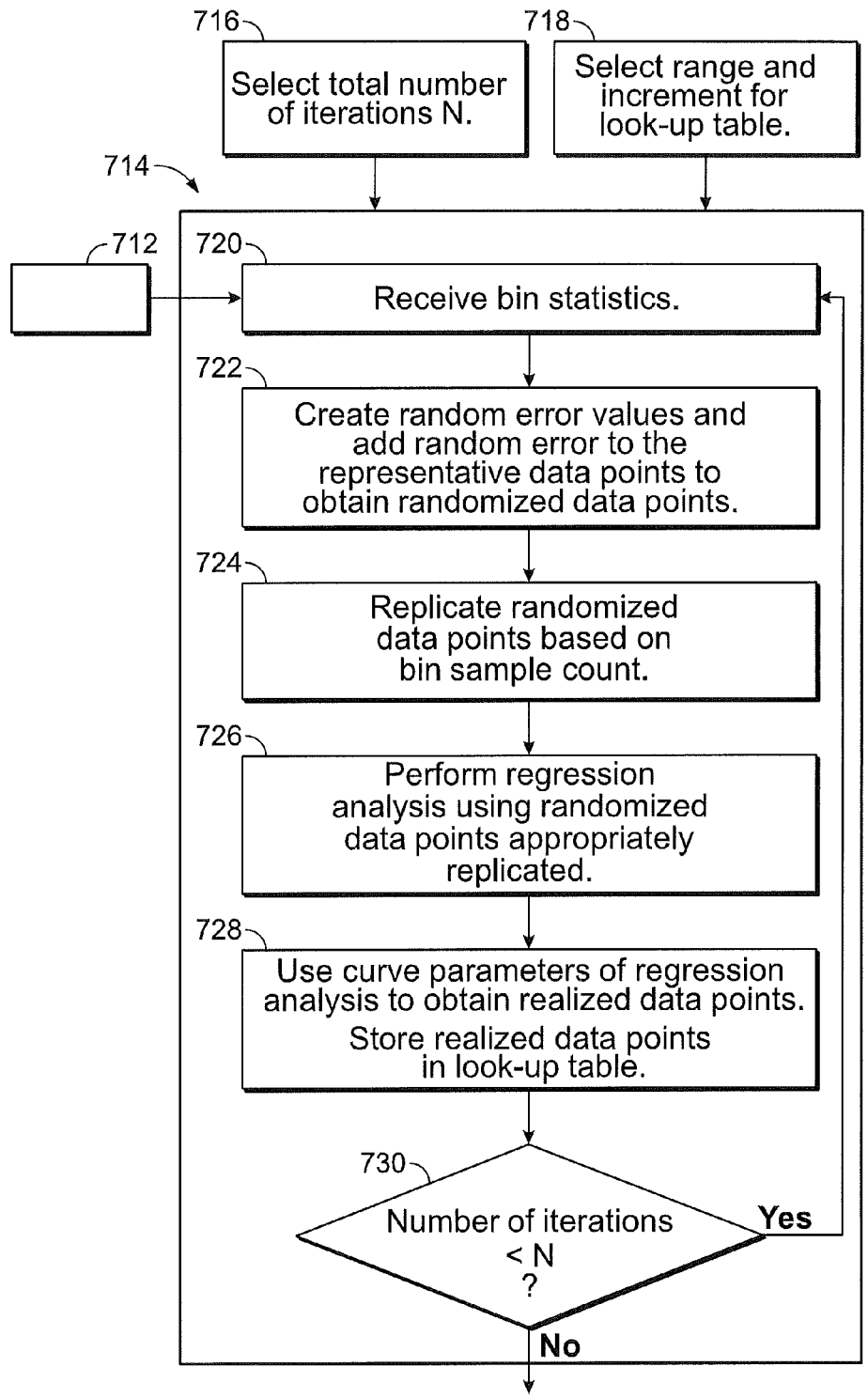
Figure 7C:
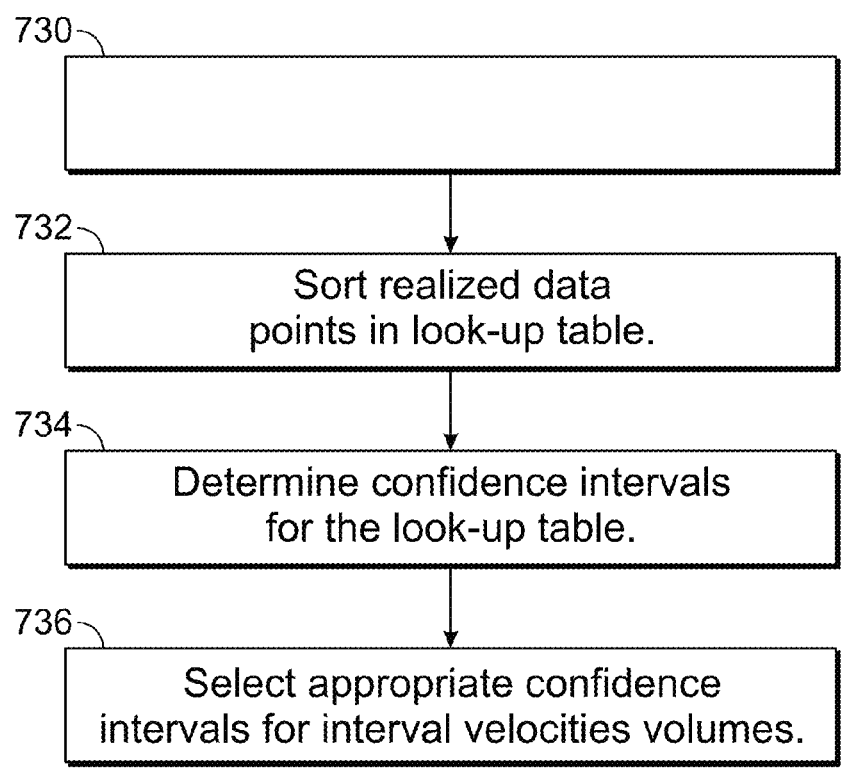

FIGS. 7A-7C shows a flowchart 700 of an exemplary method for obtaining the correlations and uncertainties of the present disclosure. In Box 702, values of a logging parameter (i.e., density, effective stress, etc.) are obtained over a depth interval of a borehole. In one embodiment, the logging parameters can be obtained using a logging apparatus, for example. In Box 704, a trace of a seismic volume parameter such as the seismic interval velocity is obtained from a three-dimensional volume. In Box 706, a cross plot is formed of the logging parameter and the seismic interval velocity. In Box 708, a plurality of bins is selected for binning the logging parameter over the interval velocity. In Box 710, the obtained values of the logging parameter are sorted into the plurality of bins. In Box 712, bin statistics are obtained for each of the plurality of bins. These bin statistics include at least one of a count of logging parameter values, interval velocity values, a mean logging parameter value, and standard deviation of the logging parameter values. In Box 714, a Monte Carlo simulation is performed using representative data points for the bins and other bin statistics obtained in Box 712.

FIG. 7B shows the Monte Carlo simulation (Box 714) of the present disclosure in detail. Prior to performing the Monte Carlo simulations, a number of iterations ("N") of the Monte Carlo simulation is decided upon in Box 716. In Box 718, a range and increment value for a lookup table is decided upon. An iteration of the Monte Carlo simulation begins at Box 720 by receiving the bin statistics obtained in Box 712 (see FIG. 7A). In Box 722, random error values are created using the received bin statistics, and the random error values are added to the coordinates of the representative data point to obtain randomized data points. In Box 724, the randomized data points are replicated based on the count of logging parameter values in the associated bin. In Box 726, regression analysis is performed using a suitable function and the randomized data set that has been appropriately replicated. In Box 728, the curve parameters of the regression function obtained via the regression analysis. Based on the curve parameters, a realization (realized values) of the logging parameters are determined and stored in a look-up table. In Box 730, a check is made whether N iterations of the Monte Carlo simulation have been performed. If N iterations have not been performed, another iteration is performed. Otherwise, the method exits the Monte Carlo simulation 714.

FIG. 7C shows an exemplary flowchart for obtaining interval volumes from look-up table obtained in FIG. 7B. In Box 732, the realized values stored in the look-up table are sorted. In Box 734, confidence intervals are determined from the look-up table. In Box 736, confidence intervals are selected from the look-up table for a seismic interval velocity volume such as shown in FIG. 1A, for example. The confidence intervals therefore provide the uncertainties for the logging parameters modeled to the three-dimensional volume.

FIG. 8A shows an exemplary look-up table 800 in one embodiment of the present disclosure. The first column of the table shows velocities for the selected seismic interval velocity bins. In a single iterative loop of the exemplary embodiment, realized values are calculated for the selected seismic interval velocities. These realized values are stored in the table 800. Realized values for a first iterative loop are shown in the column marked 'Density Run(1)'. Realized values from subsequent iterative loops are stored in their respective columns ('Density Run(2)' through 'Density Run(N)'). At the end of the N iterative loops, the data lookup table has N columns of realized values. FIG. 8B shows an exemplary lookup table storing confidence values obtained from the look-up table of FIG. 8A. Confidence values for P10, P50, and P90 are shown. For every velocity bin of table 800 (i.e., a selected row of table 800), the realizations are sorted and used to obtain the exemplary confidence values that are shown as entries in table 810.

Thus, the present disclosure provides a method of obtaining a one-dimensional parameter and a three-dimensional seismic volume parameter and determining a three-dimensional representation of the one-dimensional parameter over the seismic volume.

The present disclosure can be used to determine uncertainties in logging parameters modeled to a three-dimensional volume. In various embodiments, the methods disclosed herein can be used to determine a logging parameter of the formation in three dimensions or a formation representation. The formation representation can then be used in subsequent drilling operations. In one embodiment, the quantitative uncertainties obtained using the methods disclosed herein can be used to assess drilling risks to improved drilling operation and safety.

Therefore, in one aspect of the present disclosure, a method of establishing an uncertainty for obtained values of a one-dimensional logging parameter mapped to a three-dimensional volume is disclosed that includes: relating the obtained values of the logging parameter to a volumetric parameter of the three-dimensional volume; obtaining a set of representative data points relating the obtained values of the logging parameter to the volumetric parameter; obtaining a plurality of regression curves related to the set of representative data points, wherein obtaining a regression curve includes: (i) adding a random error to the set of representative data points to obtain a set of randomized data points, and (ii) performing a regression analysis using the set of randomized data points; and using the plurality of regression curves to establish the uncertainty for the values of the logging parameter in the three-dimensional volume. The regression analysis can be performed using a function selected from the group consisting of: (i) a linear function; (ii) a non-linear function; and (iii) a polynomial function. In an embodiment in which the volumetric parameter is a seismic interval velocity, the method includes obtaining the representative set of data points by sorting the values of the logging parameter into a plurality of bins defined over a seismic interval velocity. A representative data point for a selected bin has a y-value that is an average of the values of the logging parameters of the selected bin and an x-value that is a bin interval velocity of the selected bin. The random error can be added to the to a representative data point by adding the random error to the y-value, wherein the random error is selected from a normal distribution of the values of the logging parameter for the selected bin. Also, the random error can be added to the representative data point by adding the random error to the x-value. To perform the regression analysis, each randomized data point is weighted for the regression analysis based on a number of obtained values of the logging parameter in a bin associated with the randomized data point. In various embodiments, the logging parameter is one of: (i) a density; and (ii) an effective stress. Obtaining the set of representative data points further comprises cross-plotting the obtained logging parameter values against the volumetric parameter at the plurality of depths. Curve parameters are obtained for the regression curve and are then used to obtain realized data points of the logging parameter. At least one confidence interval is obtained using the realized data points.

In another aspect, the present disclosure provides a computer-readable medium having a set of instructions stored therein that when read by at least one processor enable the at least one processor to perform a method of establishing an uncertainty for values of a logging parameter mapped to a three-dimensional volume. The method includes relating the obtained values of the logging parameter to a volumetric parameter of the three-dimensional volume; obtaining a set of representative data points for the obtained values of the logging parameter; obtaining a plurality of regression curves related to the set of representative data points, wherein obtaining a regression curve includes: (i) adding a random error to the set of representative data points to obtain a set of randomized data points, and (ii) performing a regression analysis using the set of randomized data points; and using the plurality of regression curves to establish the uncertainty for the values of the logging parameter in the three-dimensional volume. In one embodiment, performing the regression analysis using a function selected from the group consisting of: (i) a linear function; (ii) a non-linear function; and (iii) a polynomial function. Wherein the volumetric parameter is a seismic interval velocity, the method further includes obtaining the representative set of data points by sorting the values of the logging parameter into a plurality of bins defined over a seismic interval velocity. A representative data point for a bin has a y-value that is an average of the values of the logging parameters of the selected bin and an x-value that is a bin interval velocity of the selected bin. Adding the random error to a representative data point can include adding a random error to the y-value, wherein the random error is selected from a normal distribution of the values of the logging parameter for the selected bin. Also, adding the random error to a representative data point can include adding a random error to the x-value. Performing the regression analysis can include weighting a randomized data point in the regression analysis based on a number of obtained values of the logging parameter in a bin associated with the randomized data point. In various embodiments, the logging parameter is one of: (i) a density; and (ii) an effective stress. Logging parameter realizations calculated from the regression analysis are stored in a table and used to obtain at least one confidence interval.

While the foregoing disclosure is directed to the exemplary embodiments of the disclosure, various modifications will be apparent to those skilled in the art. It is intended that all variations within the scope and spirit of the appended claims be embraced by the foregoing disclosure.

The invention claimed is:

1. A computer implemented method of establishing an uncertainty for obtained values of a one-dimensional logging parameter mapped to a three-dimensional volume, comprising:

relating, using a computer, the obtained values of the logging parameter to a volumetric parameter of the three-dimensional volume;

obtaining, using the computer, a set of representative data points relating the obtained values of the logging parameter to the volumetric parameter;

obtaining, using the computer, a plurality of regression curves related to the set of representative data points, wherein obtaining a regression curve includes:

(i) adding a random error to the set of representative data points to obtain a set of randomized data points, and (ii) performing a regression analysis using the set of randomized data points; and using the plurality of regression curves to establish the uncertainty for the obtained values of the logging parameter in the three-dimensional volume, using the computer.

2. The method of claim 1, further comprising performing the regression analysis using a function selected from the group consisting of: (i) a linear function; (ii) a non-linear function; and (iii) a polynomial function.

3. The method of claim 1, wherein the volumetric parameter is a seismic interval velocity, further comprising obtaining the representative set of data points by sorting the obtained values of the logging parameter into a plurality of bins defined over a seismic interval velocity.

4. The method of claim 3, wherein a representative data point for a selected bin has a y-value that is an average of the obtained values of the logging parameters of the selected bin and an x-value that is a bin seismic interval velocity of the selected bin.

5. The method of claim 4, wherein adding the random error to the representative data point further comprises adding the random error to the y-value, wherein the random error is selected from a normal distribution of the obtained values of the logging parameter for the selected bin.

6. The method of claim 4, wherein adding the random error to the representative data point further comprises adding another random error to the x-value.

7. The method of claim 3, wherein performing the regression analysis further comprises weighting a randomized data point in the regression analysis based on a number of obtained values of the logging parameter in a bin associated with the randomized data point.

8. The method of claim 1, wherein the logging parameter is one of: (i) a density; and (ii) an effective stress.

9. The method of claim 1, wherein obtaining the set of representative data points further comprises cross-plotting the obtained values of the logging parameter values against the volumetric parameter at a plurality of depths.

10. The method of claim 1, further comprising obtaining curve parameters for the regression plurality of the curves and using the curve parameters to obtain realized data points of the logging parameter.

11. The method of claim 10, further comprising obtaining at least one confidence interval using the realized data points.

12. A non-transitory computer-readable medium having a set of instructions stored therein that when executed by at least one processor enable the at least one processor to perform a method of establishing an uncertainty for obtained values of a logging parameter mapped to a three-dimensional volume, the method comprising:
    relating the obtained values of the logging parameter to a volumetric parameter of the three-dimensional volume;
    obtaining a set of representative data points for the obtained values of the logging parameter;
    obtaining a plurality of regression curves related to the set of representative data points, wherein obtaining a regression curve includes:
        (i) adding a random error to the set of representative data points to obtain a set of randomized data points, and
        (ii) performing a regression analysis using the set of randomized data points; and
    using the plurality of regression curves to establish the uncertainty for the obtained values of the logging parameter in the three-dimensional volume.

13. The computer-readable medium of claim 12, further comprising performing the regression analysis using a function selected from the group consisting of: (i) a linear function; (ii) a non-linear function; and (iii) a polynomial function.

14. The computer-readable medium of claim 12, wherein the volumetric parameter is a seismic interval velocity, the method further comprising obtaining the representative set of data points by sorting the obtained values of the logging parameter into a plurality of bins defined over a seismic interval velocity.

15. The computer-readable medium of claim 14, wherein a representative data point for a selected bin has a y-value that is an average of the obtained values of the logging parameter of the selected bin and an x-value that is a bin seismic interval velocity of the selected bin.

16. The computer-readable medium of claim 15, wherein adding the random error to the representative data point further comprises adding the random error to the y-value, wherein the random error is selected from a normal distribution of the obtained values of the logging parameter for the selected bin.

17. The computer-readable medium of claim 15, wherein adding the random error to the representative data point further comprises adding another random error to the x-value.

18. The computer-readable medium of claim 14 wherein performing the regression analysis further comprises weighting a randomized data point in the regression analysis based on a number of obtained values of the logging parameter in a bin associated with the randomized data point.

19. The computer-readable medium of claim 12, wherein the logging parameter is one of: (i) a density; and (ii) an effective stress.

20. The computer-readable medium of claim 12, wherein obtaining the set of representative data points further comprises cross-plotting the obtained values of the logging parameter against the volumetric parameter at a plurality of depths.

21. The computer-readable medium of claim 12, further comprising obtaining curve parameters for the plurality of the regression curves and using the curve parameters to obtain logging parameter realizations.

22. The computer-readable medium of claim 21, further comprising storing logging parameter realizations calculated from the regression analysis in a table and obtaining at least one confidence interval using the table.

* * * * *